United States Patent [19]
Pierman

[11] Patent Number: 5,244,189
[45] Date of Patent: Sep. 14, 1993

[54] VEHICLE LEAF SPRING WITH A LONGITUDINAL DISCONTINUITY FOR CRACK PROPAGATION

[75] Inventor: Richard F. Pierman, Northville, Mich.

[73] Assignee: Eaton Corporation, Cleveland, Ohio

[21] Appl. No.: 666,962

[22] Filed: Mar. 11, 1991

[51] Int. Cl.⁵ .......................... B60G 11/02; F16F 1/18
[52] U.S. Cl. ...................................... 267/47; 267/40; 267/51; 267/158; 29/173
[58] Field of Search ................... 267/7, 36.1, 37.1, 40, 267/47, 51, 158; 29/173

[56] References Cited

U.S. PATENT DOCUMENTS

| 1,638,516 | 8/1927 | Ware | 428/682 |
| 2,056,816 | 10/1936 | Zimmerli | 267/47 |
| 4,575,912 | 3/1986 | Grip et al. | 29/173 |
| 4,688,778 | 8/1987 | Woltron | 267/47 X |
| 4,747,898 | 5/1988 | Woltron | 267/47 X |

FOREIGN PATENT DOCUMENTS

| 0144436 | 7/1986 | Japan | 267/47 |
| 0638765 | 12/1978 | U.S.S.R. | 267/36.1 |
| 1278526 | 12/1986 | U.S.S.R. | 267/47 |

OTHER PUBLICATIONS

Zimmerli, F. P., "Carbon and Alloy Steel Materials for Cold-Formed Springs," *Product Engineering*, Oct. 1946, pp. 119-122.

Primary Examiner—Mark T. Le
Assistant Examiner—Josie A. Ballato
Attorney, Agent, or Firm—A. E. Chrow

[57] ABSTRACT

A vehicle suspension member such as a leaf spring (50) is provided comprising at least one composite leaf or plate (2) having a second layer (12) sandwiched within a first layer (10) in such a manner as to provide at least one discontinuity therein effective to divert crack propagation in a direction generally parallel to a longitudinal axis ("L/A") extending between opposite ends of plate (2).

4 Claims, 2 Drawing Sheets 5,244,189

VEHICLE LEAF SPRING WITH A LONGITUDINAL DISCONTINUITY FOR CRACK PROPAGATION

INTRODUCTION

This invention relates generally to a vehicle suspension member and method for making same such as a leaf spring having at least one composite leaf or plate having a longitudinal axis extending therealong between opposite ends thereof and having at least one core or layer effective to provide a discontinuity therewithin that is disposed in a direction generally parallel to the longitudinal axis and effective to divert or redirect crack propagation in a direction generally parallel thereto.

BACKGROUND OF THE INVENTION

Although coil springs have recently come into favor for passenger car suspension systems, leaf springs remain in favor for use particularly in truck suspension systems and are likely to for many years to come because of the capacity, packaging and axle location advantages associated therewith. Although described herein with particularlity to leaf springs, the present invention includes any vehicle suspension members subject to torsional or bending loads and having a longitudinal axis extending therealong between opposite ends such as torque rods (also called a trailing arm) for axle control; traction bars (keep axle from twisting during braking); and track rods (keep axle from shifting laterally).

Leaf springs generally comprise a singular leaf or plate or a plurality of stacked leafs or plates of substantially constant or tapered thickness most commonly made from steel and secured together and operative to support the frame of the vehicle on the wheel axle. As might be expected, the number of leafs or plates employed in the leaf spring is based upon allowable design stress for a given load capacity and deflection range.

Each plate or leaf is subjected to cantilever bending producing a (positive) tensile stress on the upper, typically concave, surface of the leaf to which the vehicle load or force is applied. As a result, a balancing (negative) compressive stress is developed on the lower, typically convex, surface of the leaf. The tensile stress is a maximum at the upper surface of the leaf and decreases to zero at or near the center of the plate thickness also known as the neutral axis, hereinafter referred to as longitudinal axis, extending between opposite ends of the leaf or plate. Similarly, the balancing compressive stress is a maximum on the lower surface declining to zero at the longitudinal axis. Virtually all cracks are initiated at or near the upper surface of the leaf spring plate at the point of maximum tensile stress.

Due to high strength requirements, leaf springs must have high hardness that is associated with rapid crack propagation through the leaf construction once a relatively shallow crack is developed at the tensile surface. The incidence of crack initiation and progression is generally a function of increased service life or time and also service conditions including load history and corrosion. No matter how a crack may develop, i.e.; fatigue and/or corrosion, its progression beyond a critical depth of generally less than one-half of section thickness is rapid to complete fracture or separation.

The present invention provides a means of detering or diverting crack propagation that initiates at or near the upper tensile surface and progresses through the thickness of the leaf or plate in a direction generally perpendicular to the longitudinal axis of the leaf by redirecting crack progression in a direction generally parallel thereto. Effectively, the parallel crack or delamination of the flat (or tapered) plate section lowers section stiffness causing the spring to sag well before final fracture providing the user some early indication of impending spring failure prior to complete separation and possible vehicle debilitation.

An early example of a composite metal plate featuring an elastic malleable iron sandwiched between layers of tempered steel is disclosed in U.S. Pat. No. 1,638,516, the disclosure of which is incorporated herein by reference. Here, however, the two metals are joined together to form an integral unit to provide a dampening function whereas the present invention is addressed to purposefully introducing at least one discontinuity into the suspension member to promote a delaminating function signaling failure of the member.

SUMMARY OF THE INVENTION

Accordingly, it is an object of this invention to provide a vehicular composite suspension member such as a leaf spring employing at least one leaf or plate having a longitudinal axis extending therealong between opposite ends that is adapted to divert or redirect crack propagation in a direction generally parallel thereto.

It is another object of this invention to provide a method for making a vehicle composite leaf spring employing at least one leaf or plate having a longitudinal axis extending therealong between opposite ends thereof that is adapted to divert or redirect crack propagation in a direction generally parallel thereto.

DESCRIPTION OF SOME PREFERRED EMBODIMENTS

Figure 1:
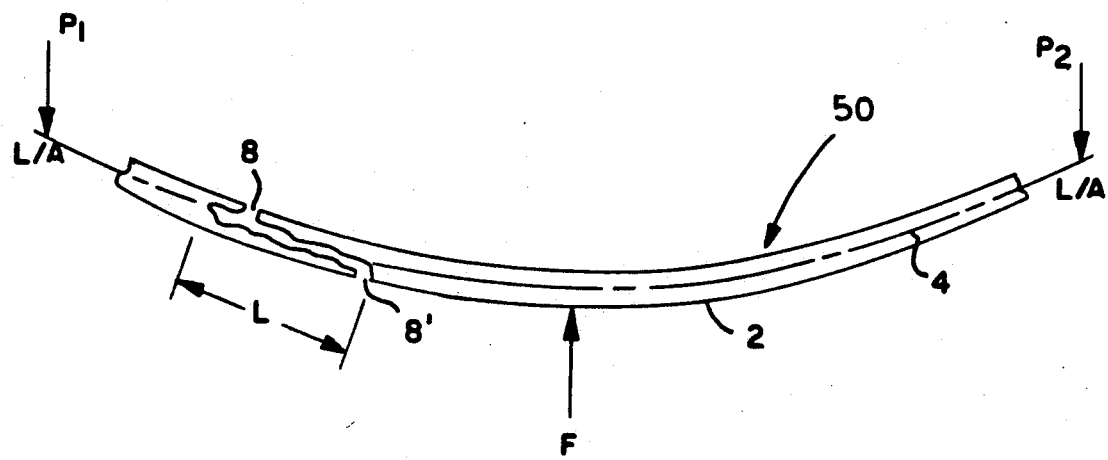
FIG. 1 is a side view of a vehicle suspension leaf spring 50 showing the redirected crack propagation.

Leaf spring 50 of FIG. 1 is illustrative of the manner in which crack propagation is diverted or directed in accordance with the invention. Spring 50 comprises a singular composite leaf or plate 2 as hereinafter described that extends between opposite ends thereof (not shown) that are adapted, such as by being formed into eyelets, for securing to a vehicle frame or perhaps to another suspension system that is secured to the vehicle frame. In some instances it may be preferable to omit eyelets and commonly only one plate in a stacked plurality of spring leaf plates need have eyelets at one or both of its opposite ends.

Although plate 2 is shown in FIG. 1 as tapering towards its opposite ends to provide the thickest section at its center, plate 2 may have a substantially constant thickness throughout its entire length as is well known to those skilled in the leaf spring art.

Plate 2 has a longitudinal axis 4 designated as "L/A" that extends therealong between its opposite ends.

For illustrative purposes, repetitive bending loads "P$_1$" and "P$_2$" have been applied to opposite ends of plate 2 at the point of securement (not shown) that have created reaction force "F" at the spring seat that commonly bridges the center and which has ultimately caused a crack to occur at the upper tensile surface due to fatigue as denoted by reference numeral 8. But, rather than cracking completely through plate 2 in a direction generally transverse to axis "L/A", the crack has been diverted or directed in a direction generally parallel to axis "L/A", a distance "L" before ultimately exiting on the bottom side at reference numeral 8'.

The diversion of crack propagation in a direction generally parallel to axis "L/A" is provided by a discontinuity arising from a core or layer purposefully introduced into composite leaf or plate 2 as hereinafter described with respect to FIG. 2.

As used herein, the word "discontinuity" means a discontinuity in mechanical properties situated along a single plane or along multiple planes that are disposed in a direction generally parallel to the longitudinal axis but not necessarily continuous therealong. In instances where the suspension member is a leaf or plate subject to bending loads, the discontinuity is preferably disposed near the neutral axis of the leaf or plate.

Figure 2:
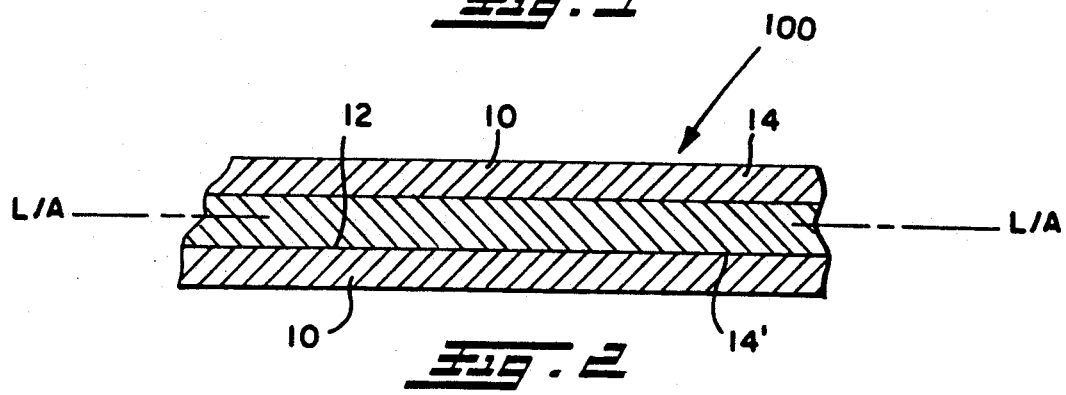
FIG. 2 is a partial cross-section through a composite leaf or plate 100 made in accordance with the invention.

In FIG. 2, a composite leaf or plate 100 has been made in accordance with the invention. Plate 100 has a first layer 10 within which is disposed a second layer 12.

Figure 3:
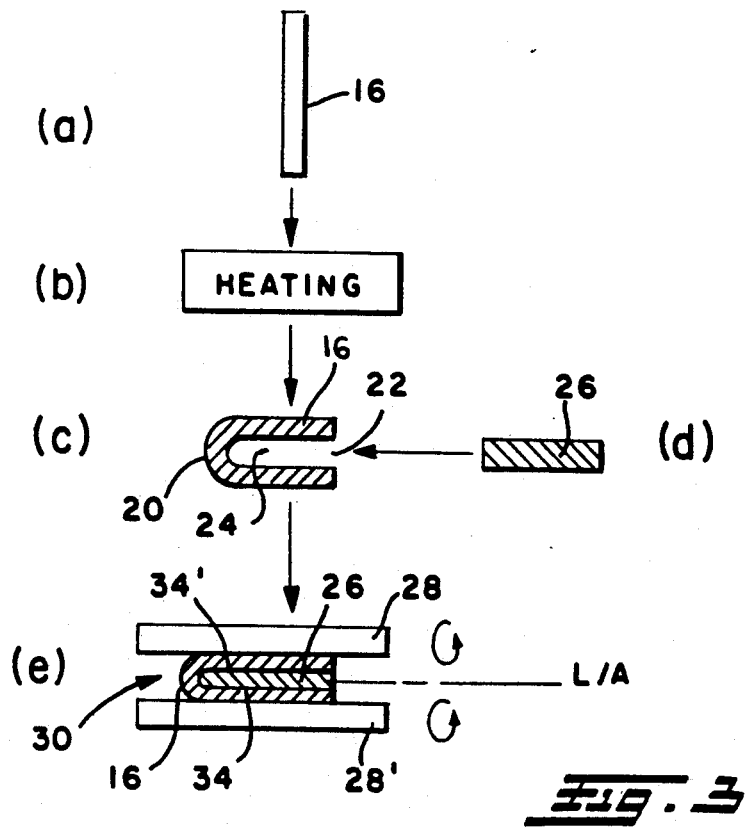
FIG. 3 is a schematic block diagram of a method for making a composite leaf or plate in accordance with the invention.

Selected properties of materials from which first layer 10 and second layer 12 are made differ to the extent necessary to create a discontinuity therewithin such as spaced apart discontinuities 14 and 14' on opposite sides of layer 12 that are in general parallel alignment with axis "L/A" of leaf or plate 100 and are respectively effective to divert or direct crack propagation in a direction generally parallel thereto. In FIG. 3, a first layer 16, preferably having a substantially retangular cross-section, is selected in step (a) and, in instances where member 16 is made from steel, is preferably heated in step (b) to a predetermined temperature such as from about 1700° F. to about 2200° F. and then folded in step (c) such that it has a substantially U shaped cross-section having a cavity 24 extending between a closed end 20 and an open end 22 along the length of folded member 16.

A second layer 26 is inserted into cavity 24 in step (d). Layer 26 extends for most, if not all, of the length of cavity 22.

In step (e), the combination of folded first layer 16 and second layer 26 are compressed together between rollers 28 and 28' or other suitable compression means in a manner effective to provide composite leaf or plate 30 with a discontinuity extending therealong that is in general parallel alignment with longitudinal axis "L/A".

In this case, second layer 26 may be made from a low carbon steel having a lower notch sensitivity or a slower crack propagation rate than the first layer which may be made from a selected spring steel alloy.

Figure 4:
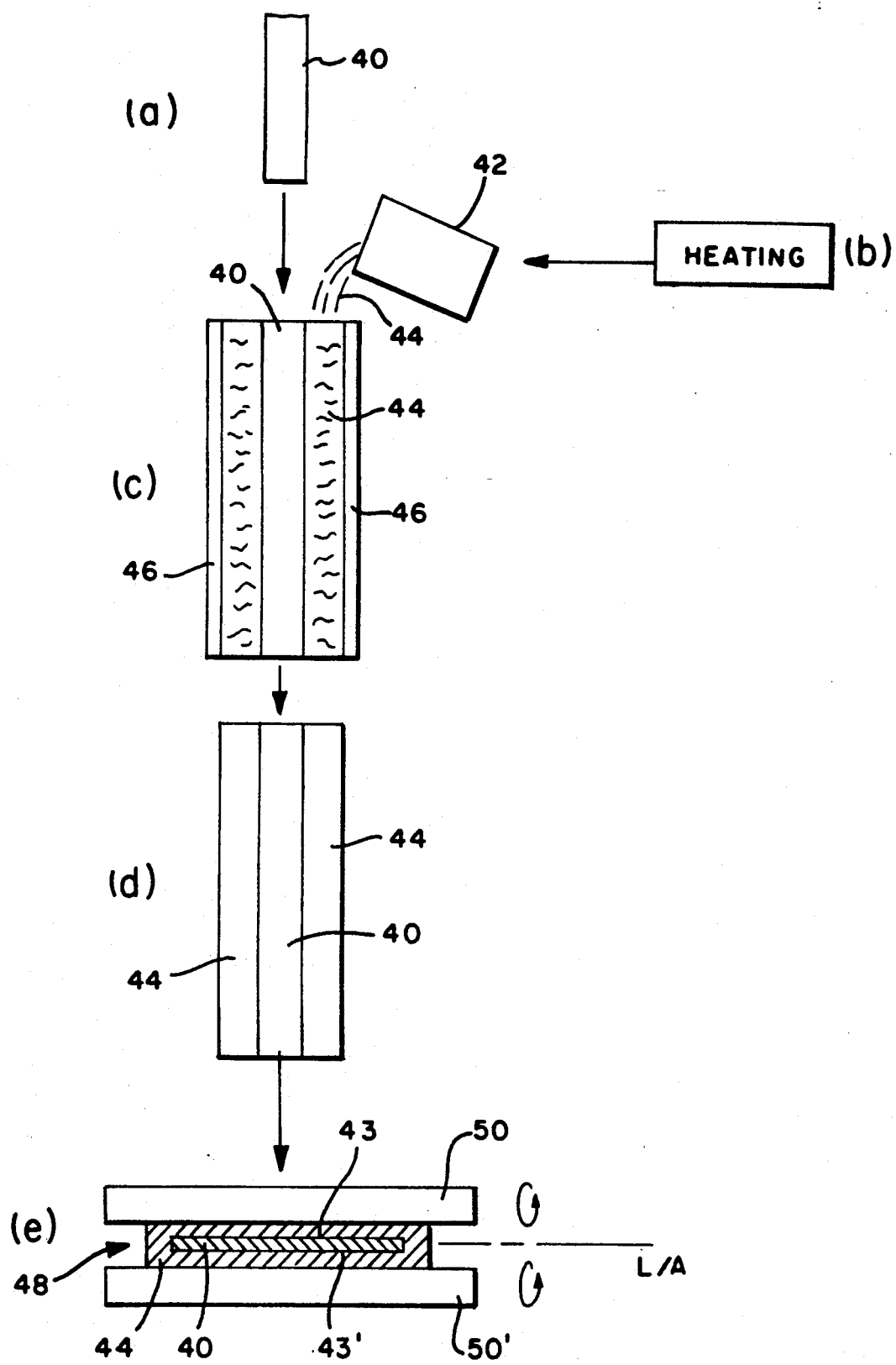
FIG. 4 is a schematic block diagram of another method for making a composite leaf or plate in accordance with the invention.

Alternately second layer 26 may be copper or a copper alloy providing an even greater discontinuity at the interface with first metal layer 16. Either is sufficient to provide a discontinuity such as spaced-apart discontinuities 34 and 34' that are disposed in a direction generally parallel to axis "L/A" and operative to divert crack propagation in a direction generally parallel thereto. In FIG. 4, a second core 40 in step (a) is received into a suitable mold having a surrounding sidewall 46. A first metal material 44 is heated to a casting temperature in step (b) and cast from ladle 42 in step (c) as a liquid about core 40 which is made from a different metal having a higher melt temperature than the melt temperature of metal 44. In step (d), cast metal 44 has cooled and solidified about core 40. The combination is then compressed in step (e) between rollers 50 and 50' or other suitable compression means to provide composite leaf or plate 48 having second metal layer 40 disposed within first metal layer 44 to provide a discontinuity therewithin such as spaced-apart discontinuities 43 and 43' disposed on opposite sides of layer 40 that are disposed in general to parallel axis "L/A".

In this example, there may be some diffusion of second core 40 into first metal 44 because it has been heated such as where core 40 is copper or a copper alloy and metal 44 is made from a spring steel alloy. Short heating time and rapid cooling of first member 44 however can keep the diffusion to a minimum and provide sufficient discontinuities between the two effective to divert crack propagation in a direction generally parallel to axis "L/A".

Additional materials such as other metals or suitable fibers such as graphite fibers may be included in core 40 or at the interface between layers 10 and 12 to impart greater discontinuity in the structure.

What is claimed is:

1. A vehicle suspension composite member having a longitudinal axis extending between opposite ends therealong, said suspension member having a second layer disposed within a first layer and in general parallel alignment with the longitudinal axis, said second layer having properties that differ from corresponding properties of the first layer to the extent necessary to create at least one discontinuity within the suspension member that is generally parallel to the longitudinal axis and effective to divert crack propagation in a direction generally parallel to the longitudinal axis.

2. The suspension member of claim 1 wherein the first layer is made from a spring steel alloy and the second layer is made from low carbon steel alloy having a slower crack propagation rate than the crack propagation rate for the spring steel alloy.

3. The suspension member of claim 1 wherein the first layer is made from a spring steel alloy and the second layer is a selected one of copper and a copper alloy.

4. The suspension member of claim 1 in the form of a leaf spring having at least one plate having the longitudinal axis extending between opposite ends therealong and having the discontinuity disposed in a direction generally parallel to the longitudinal axis.

* * * * *